C. T. SCHOEN.
Furniture Caster.
No. 229,478 — Patented June 29, 1880.
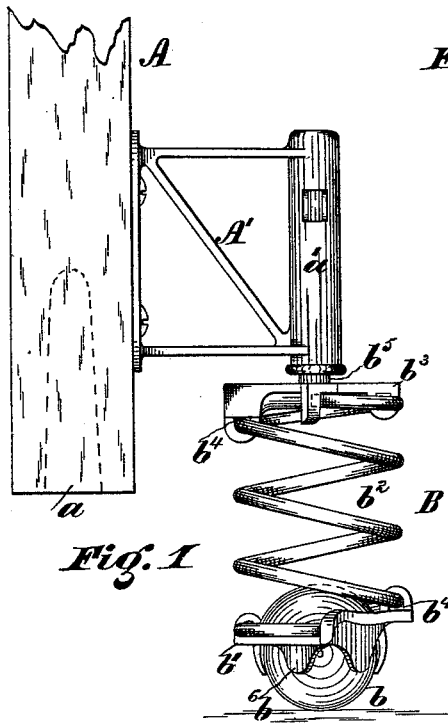
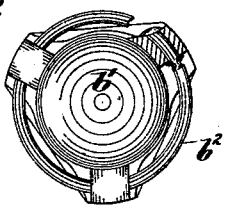
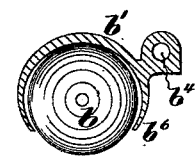
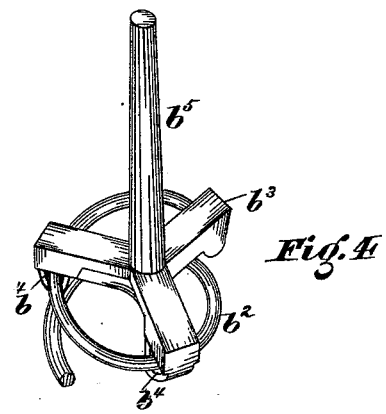
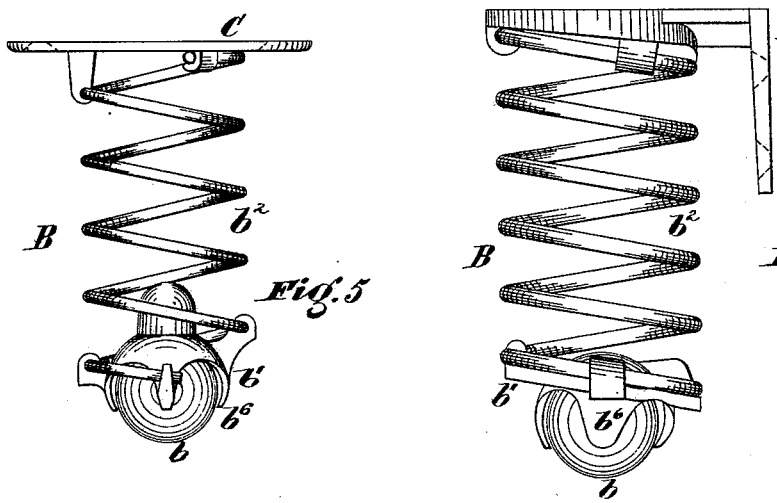
WITNESSES:
Saml. J. VanStavoren
John J. Darby
INVENTOR,
Charles T. Schoen,
By Connolly Bros.,
ATTORNEYS.

the case of other furniture with springs or other devices heretofore employed to give elasticity.

UNITED STATES PATENT OFFICE.

CHARLES T. SCHOEN, OF PHILADELPHIA, PENNSYLVANIA.

FURNITURE-CASTER.

SPECIFICATION forming part of Letters Patent No. 229,478, dated June 29, 1880.

Application filed October 16, 1879.

*To all whom it may concern:*

Be it known that I, CHARLES T. SCHOEN, of Philadelphia, in the county of Philadelphia and State of Pennsylvania, have invented certain new and useful Improvements in Spring-Casters; and I do hereby declare the following to be a full, clear, and exact description of the invention, such as will enable others skilled in the art to which it pertains to make and use it, reference being had to the accompanying drawings, which form part of this specification, in which—

Figure 1 is a side elevation of my invention; Fig. 2, plan of the lower fastening-plate, partly in section. Fig. 3 is a vertical section of the same; Fig. 4, perspective of the upper fastening-plate and a section of the spring attached thereto; and Figs. 5 and 6 are modifications of my invention.

My invention has for its object to provide a spring-support for bedsteads and other pieces of furniture, such spring-support consisting of a caster fitted in the usual socket in the leg of such bedstead or piece of furniture, or being otherwise suitably fastened to the side or bottom of said leg.

My invention consists of a spring-caster of the peculiar construction hereinafter specified, such caster being composed of the following parts, viz: a ball or roller, a socket or fastening-piece for said ball or roller, a spindle, shank, plate, or other fastening for attaching the caster to the piece of furniture or fitting it in a socket therein or thereon, and a spiral spring located between the ball or roller socket or fastening and the fastening whereby it is attached to the leg of the piece of furniture, and forming the connection between said fastenings.

Referring to the accompanying drawings, A indicates the leg of a bedstead or other piece of furniture, having a socket, $a$, formed in it, or a socket, $a'$, in a plate or bracket, A', attached to the side thereof.

B represents a caster composed of a ball or roller, $b$, a fastening or socket, $b'$, a spiral spring, $b^2$, and a bearing plate or bar, $b^3$, which forms the fastening whereby the caster is secured to the leg A or fitted to the socket $a$ or $a'$.

The opposite ends of the spring $b^2$ are secured in any suitable and appropriate manner to the fastenings $b'$ and $b^3$, preferably by causing the said ends to pass into openings $b^4$ formed in the castings, said ends being retained therein by forming a burr thereon, or by equivalent means.

The fastening $b^3$ may have, and, by preference, should have, a spindle or shank, $b^5$, adapted to enter the socket $a$ or $a'$; but other forms of connection may be substituted for this spindle—for example, the plate C, (shown in Fig. 5,) which is designed to be screwed or otherwise fastened to the under side of the leg A, or a bracket, D, secured to one side of said leg.

It will be noted that the spring $b^2$ forms the connection between the fastenings $b'$ and $b^3$, and is located outside of or below the leg of the piece of furniture; also, that the shank or spindle $b^5$ is wholly above the spring, and does not pass through the latter. Hence, when pressure, weight, or impact is imposed on the piece of furniture the caster-spring is compressed, without, however, causing any movement of its spindle or shank in its socket or through the spring, thus avoiding the friction which would result if such spindle had an endwise movement in the leg-socket, or if such spring were of such diameter as to fit into said socket and were fitted therein.

By placing the spring outside of such socket it can be made of such dimensions as will permit it to yield readily, and yet possess requisite strength or resiliency to rebound or give the desired elastic action—in other words, will permit the use of a spring which is at once soft or easy and at the same time strong.

I have shown a ball; but in lieu thereof a cylindrical roller may be employed; and instead of the ends $b^6$ $b^6$, which form the means for holding said ball in place, a socket of different construction, or other means of holding the ball or roller, may be employed.

With the construction specified the spring-caster may be at once fitted to the socket in or on any ordinary socketed-bed or other piece of furniture, the latter, therefore, requiring no special preparation.

In use the caster will form an admirable spring-support, dispensing, in the case of beds, with spring-mattresses or bed-bottoms, and in the case of chairs, sofas, and the like with the usual springs in the upholstering work.

What I claim as my invention is—

A caster composed of a spiral spring, a ball or roller, and fastenings, to which the ends of the spring are attached, said fastenings forming, respectively, the socket for the ball or roller and the medium of attachment to the piece of furniture or its socket, and said spring being the sole connection between said fastenings, as set forth.

In testimony that I claim the foregoing I have hereunto set my hand this 9th day of October, 1879.

CHARLES T. SCHOEN.

Witnesses:
WM. M. MCKNIGHT,
SAML. J. VAN STAVOREN.